(12) United States Patent
Hirahata et al.

(10) Patent No.: US 7,939,460 B2
(45) Date of Patent: May 10, 2011

(54) PROCESS FOR PRODUCING SOLID CATALYST COMPONENT PRECURSOR FOR OLEFIN POLYMERIZATION

(75) Inventors: Wataru Hirahata, Sodegaura (JP); Shinya Nakahara, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/576,405

(22) Filed: Oct. 9, 2009

(65) Prior Publication Data

US 2010/0125125 A1 May 20, 2010

(30) Foreign Application Priority Data

Nov. 19, 2008 (JP) .................. 2008-295413

(51) Int. Cl.
*B01J 31/00* (2006.01)
*C08F 4/44* (2006.01)
*C08F 4/06* (2006.01)

(52) U.S. Cl. .................. 502/104; 526/124.8; 526/125.3; 526/126; 526/128; 526/130; 502/115

(58) Field of Classification Search .................. 502/103, 502/104, 115, 116, 126, 127, 128; 526/124.8, 526/125.3, 907
See application file for complete search history.

(56) References Cited

U.S. PATENT DOCUMENTS

| | | | | |
|---|---|---|---|---|
| 3,392,159 | A * | 7/1968 | Schooley et al. | 526/144 |
| 3,901,863 | A * | 8/1975 | Berger et al. | 526/114 |
| 4,672,050 | A | 6/1987 | Sasaki et al. | |
| 6,187,883 | B1 * | 2/2001 | Satoh et al. | 526/125.3 |
| 6,703,456 | B2 * | 3/2004 | Mori et al. | 526/124.3 |
| 6,903,041 | B2 * | 6/2005 | Kumamoto et al. | 502/128 |
| 7,256,151 | B2 * | 8/2007 | Kumamoto | 502/127 |
| 2004/0030067 | A1 * | 2/2004 | Mori et al. | 526/124.3 |

\* cited by examiner

*Primary Examiner* — David Wu
*Assistant Examiner* — Elizabeth Eng
(74) *Attorney, Agent, or Firm* — Panitch Schwarze Belisario & Nadel LLP

(57) ABSTRACT

A production process is provided for an olefin polymerization catalyst component precursor, including the steps of (I) adding an organomagnesium compound to a solution containing a solvent, a Si—O bond-containing silicon compound, and a defined titanium compound, under agitation, and continuing the agitation until a magnesium concentration in a liquid phase of a reaction mixture decreases to 9 ppm by weight or lower, and (II) solid-liquid separating the reaction mixture. A production process is also provided for an olefin polymerization catalyst component using the above precursor. Further, producing process is provided for an olefin polymerization catalyst using the above catalyst component. Still further, a production process is provided for an olefin polymer using the above catalyst.

7 Claims, No Drawings

PROCESS FOR PRODUCING SOLID CATALYST COMPONENT PRECURSOR FOR OLEFIN POLYMERIZATION

FIELD OF THE INVENTION

The present invention relates to a process for producing a solid catalyst component precursor for olefin polymerization; a process for producing an olefin polymerization solid catalyst component, using a solid catalyst component precursor produced according to the above production process; a process for producing an olefin polymerization solid catalyst, using an olefin polymerization solid catalyst component produced according to the above production process; and a process for producing an olefin polymer, using an olefin polymerization solid catalyst produced according to the above production process; those processes being suitable for a gas-phase polymerization process or a slurry polymerization process.

BACKGROUND OF THE INVENTION

A large amount of olefin polymers adhering to a polymerization reactor is a source of troubles for operating a production process of olefin polymers. Therefore, it is desirable that an amount of olefin polymers adhering thereto is as small as possible. From such a viewpoint, it is preferable that olefin polymer powders obtained by olefin polymerization have the following particle properties: high in their bulk density, small in their content of fine powders, narrow in their particle size distribution, and excellent in their fluidity.

U.S. Pat. No. 4,672,050 (corresponding to JP 61-218606A) discloses an α-olefin polymerization catalyst, which is high in its polymerization activity, hardly decreases stereoregularity during polymerization, and makes only a small amount of by-product amorphous polymer, and which catalyst is formed by a process comprising the steps of (i) contacting a solid catalyst component precursor with an ester compound, an ether compound and titanium tetrachloride, thereby obtaining a trivalent titanium compound-containing solid catalyst component, and (ii) contacting the obtained catalyst component with an organoaluminum compound and an electron donor compound (third component).

U.S. Pat. No. 6,187,883 (corresponding to JP 10-212312A) discloses an α-olefin polymerization catalyst, which is high in its polymerization activity, and makes only a very small amount of by-product amorphous polymer, and which catalyst is formed by a process comprising the steps of (i) reducing a titanium compound by an organomagnesium compound in the presence of a silicon compound and an ester compound, thereby obtaining a solid catalyst component precursor, (ii) contacting the obtained precursor with a halogenating compound, an electron donor and an organic acid halide, thereby obtaining a trivalent titanium compound-containing solid catalyst component, and (iii) contacting the obtained catalyst component with an organoaluminum compound and an electron donor compound (third component).

U.S. Pat. No. 6,903,041 (corresponding to JP 11-322833A) discloses an olefin polymerization catalyst, which is very excellent in its particle properties, is high enough in its polymerization activity, and makes only a small amount of low molecular weight polymer components, and which catalyst is formed by a process comprising the steps of (i) contacting a solid catalyst component precursor, a halogen-containing compound of Group 14 elements and an electron donor, with one another, then (ii) further contacting with titanium tetrachloride, thereby obtaining a solid catalyst component, and (iii) combining the obtained catalyst component with an organoaluminum compound.

SUMMARY OF THE INVENTION

However, olefin polymer powders obtained using the above respective olefin polymerization catalysts are unsatisfactory in their fine powder content.

In view of the above circumstances, the present invention has an object to provide (i) a process for producing a solid catalyst component precursor for olefin polymerization, (ii) a process for producing an olefin polymerization solid catalyst component, (iii) a process for producing an olefin polymerization solid catalyst, and (iv) a process for producing an olefin polymer; those processes being suitable for producing olefin polymers containing only a small amount of fine powders.

The present invention is a process for producing a solid catalyst component precursor for olefin polymerization, comprising the steps of:

(I) adding an organomagnesium compound to a solution containing a solvent, a Si—O bond-containing silicon compound, and a titanium compound represented by the following formula, under an agitation, and continuing the agitation until a magnesium concentration in a liquid phase of a reaction mixture decreases to 9 ppm by weight or lower; and (II) solid-liquid separating the reaction mixture;

$$Ti(OR^1)_a X^1_{4-a}$$

wherein $R^1$ is a hydrocarbyl group having 1 to 20 carbon atoms; $X^1$ is a halogen atom; and a is a number satisfying $1 < a \leq 4$.

Also, the present invention is a process for producing an olefin polymerization solid catalyst component, comprising the step of contacting a solid catalyst component precursor for olefin polymerization produced according to the above production process with a halogenating metal compound represented by the following formula, an internal electron donor, and an optional organic acid halide:

$$M(R^2)_b X^2_{m-b}$$

wherein M is an element of Group 4, 13 or 14; $R^2$ is an alkyl group having 1 to 20 carbon atoms, an aryl group, an alkoxy group, or an aryloxy group; $X^2$ is a halogen atom; m is an atomic valence of M; and b is a number satisfying $0 < b \leq m$.

The above "halogenating metal compound" is a metal compound having a halogenating ability, which is a kind of halogenating agent.

Further, the present invention is a process for producing an olefin polymerization solid catalyst, comprising the step of contacting an olefin polymerization solid catalyst component produced according to the above production process with an organoaluminum compound, and an optional external electron donor.

Still further, the present invention is a process for producing an olefin polymer, comprising the step of polymerizing an olefin in the presence of an olefin polymerization solid catalyst produced according to the above production process.

DETAILED DESCRIPTION OF THE INVENTION

Examples of the Si—O bond-containing silicon compound are compounds represented by the following formulas:

$$Si(OR^3)_t R^4_{4-t},$$

$$R^5(R^6_2SiO)_u SiR^7_3, \text{ and}$$

$$(R^8_2SiO)_v$$

wherein $R^3$ is a hydrocarbyl group having 1 to 20 carbon atoms; $R^4$ to $R^8$ are independently of one another a hydrocarbyl group having 1 to 20 carbon atoms, or a hydrogen atom; t is an integer satisfying $0 < t \leq 4$; u is an integer of 1 to 1,000; and v is an integer of 2 to 1,000.

Among them, preferred are silicon compounds having t satisfying $1 \leq t \leq 4$ in the above formula, more preferred are tetraalkoxysilanes (t=4), and most preferred is tetraethoxysilane.

Examples of the Si—O bond-containing silicon compound are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Examples of $R^1$ in the above formula representing the titanium compound are alkyl groups such as a methyl group, an ethyl group, a propyl group, an isopropyl group, a n-butyl group, an isobutyl group, an amyl group, an isoamyl group, a hexyl group, a heptyl group, an octyl group, a decyl group and a dodecyl group; aryl groups such as a phenyl group, a cresyl group, a xylyl group and a naphthyl group; cycloalkyl groups such as a cyclohexyl group and a cyclopentyl group; and an aralkyl group such as a benzyl group.

$R^1$ is preferably alkyl groups having 2 to 18 carbon atoms, or aryl groups having 6 to 18 carbon atoms, and particularly preferably linear alkyl groups having 2 to 18 carbon atoms.

Examples of $X^1$ in the above formula representing the titanium compound are a chlorine atom, a bromine atom and an iodine atom. Among them, a chlorine atom is particularly preferable.

Examples of the titanium compound represented by the above formula are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, and combinations of two or more thereof. Among them, preferred are titanium compounds having "a" of 1, 2 or 4 in the above formula, and particularly preferred is tetra-n-butoxytitanium.

The above organomagnesium compound is any compounds containing a magnesium-carbon bond therein. Examples of the organomagnesium compound are compounds represented by the following formulas:

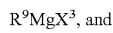

wherein $R^9$ to $R^{11}$ area hydrocarbyl group having 1 to 20 carbon atoms; and $X^3$ is a halogen atom.

Examples of $R^9$ to $R^{11}$ are alkyl groups, aryl groups, aralkyl groups and alkenyl groups, those groups having 1 to 20 carbon atoms, respectively, such as a methyl group, an ethyl group, a propyl group, an isopropyl group, a n-butyl group, a sec-butyl group, a tert-butyl group, an isobutyl group, a n-pentyl group, an isoamyl group, a cyclopentyl group, a n-hexyl group, a cyclohexyl group, a n-octyl group, a 2-ethylhexyl group, a phenyl group and a benzyl group.

Examples of $X^3$ in the above formula are a chlorine atom, a bromine atom and an iodine atom. Among them, a chlorine atom is particularly preferable.

Examples of the Grignard compound represented by the above former formula are methylmagnesium chloride, ethylmagnesium chloride, n-propylmagnesium chloride, isopropylmagnesium chloride, n-butylmagnesium chloride, isobutylbutylmagnesium chloride, tert-butylmagnesium chloride, n-pentylmagnesium chloride, isoamylmagnesium chloride, cyclopentylmagnesium chloride, n-hexylmagnesium chloride, cyclohexylmagnesium chloride, n-octylmagnesium chloride, 2-ethylhexylmagnesium chloride, phenylmagnesium chloride, and benzylmagnesium chloride. Among them, preferred is ethylmagnesium chloride, n-propylmagnesium chloride, isopropylmagnesium chloride, n-butylmagnesium chloride, or isobutylbutylmagnesium chloride, and particularly preferred is n-butylmagnesium chloride, in order to obtain good shape-carrying polymerization catalysts.

Those Grignard compounds are used preferably as an ether solution thereof. Examples of the ether are dialkyl ethers such as diethyl ether, di-n-propyl ether, diisopropyl ether, di-n-butyl ether, diisobutyl ether, ethyl n-butyl ether, and diisoamyl ether; and cyclic ethers such as tetrahydrofuran. Among them, preferred are dialkyl ethers, and particularly preferred is di-n-butyl ether or diisobutyl ether.

The step (I) may use ester compounds. Examples thereof are monocarboxylic acid esters and polycarboxylic acid esters. More specific examples thereof are saturated aliphatic carboxylic acid esters, unsaturated aliphatic carboxylic acid esters, alicyclic carboxylic acid esters, and aromatic carboxylic acid esters. Further specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, di-n-butyl succinate, diisobutyl succinate, diethyl malonate, di-n-butyl malonate, diisobutyl malonate, dimethyl maleate, di-n-butyl maleate, diisobutyl maleate, diethyl itaconate, di-n-butyl itaconate, diisobutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl)phthalate, diisodecyl phthalate, dicyclohexyl phthalate and diphenyl phthalate. Among them, preferred are unsaturated aliphatic carboxylic acid esters such as methacrylic acid esters and maleic acid esters, or aromatic carboxylic acid esters such as benzoic acid esters and phthalic acid esters, and particularly preferred are phthalic acid dialkyl esters.

Examples of the solvent in the step (I) are aliphatic hydrocarbons such as hexane, heptane, octane and decane; aromatic hydrocarbons such as toluene and xylene; alicyclic hydrocarbons such as cyclohexane, methylcyclohexane and decalin; dialkyl ethers such as diethyl ether, di-n-propyl ether, diisopropyl ether, di-n-butyl ether, diisobutyl ether, ethyl n-butyl ether, and diisoamyl ether; and cyclic ether such as tetrahydrofuran.

The silicon compound in the step (I) is used in an amount of usually 1 to 500 mol, preferably 1 to 300 mol, and particularly preferably 3 to 100 mol, in terms of an amount of silicon atoms contained in the silicon compound used in the step (I), per one mol of titanium atoms contained in the titanium compound used in the step (I).

The organomagnesium compound in the step (I) is used in an amount such that the total amount of the above titanium atoms and silicon atoms is usually 0.1 to 10 mol, preferably 0.2 to 5.0 mol, and particularly preferably 0.5 to 2.0 mol, per one mol of magnesium atoms contained in the organomagnesium compound used in the step (I).

Also, each of the titanium compound, the silicon compound and the organomagnesium compound in the step (I) may be determined in its used amount such that an amount of magnesium atoms contained in the obtained solid catalyst component precursor is 1 to 51 mol, preferably 2 to 31 mol, and particularly preferably 4 to 26, per one mol of titanium atoms contained in the solid catalyst component precursor.

The ester compound in the step (I) is used in an amount of usually 0.05 to 100 mol, preferably 0.1 to 60 mol, and particularly preferably 0.2 to 30 mol, per one mol of titanium atoms contained in the titanium compound used in the step (I).

In the step (I), the organomagnesium compound is added at usually −50 to 100° C., preferably −30 to 70° C., and particularly preferably −25 to 50° C., to the solution containing a solvent, a Si—O bond-containing silicon compound, and a titanium compound. Its adding time is not particularly limited, and is usually 30 minutes to 6 hours. In order to produce a good shape-carrying catalyst, the organomagnesium compound is preferably added thereto continuously.

After adding the organomagnesium compound to the above solution, the agitation in the step (I) is continued to promote the reaction. The agitation time thereafter depends on a solution temperature, and is 15 to 200 hours, and preferably 18 to 200 hours when the solution temperature is 10° C. to lower than 30° C., and is 3 to 200 hours, and preferably 4 to 200 hours when the solution temperature is 30 to 70° C. The most preferable embodiment is an agitation for 4 to 200 hours at a solution temperature of 30 to 70° C.

Examples of a method for measuring the magnesium concentration in the step (I) is a high-frequency inductively coupled plasma atomic emission spectrometry (ICP-AES), and an atomic absorption method, known in the art. The ICP-AES usually comprises the steps of (i) decomposing organic compounds contained in a measurement sample by a pretreatment such as a microwave irradiation, an acid digestion, and a dry ashing, thereby obtaining a pretreated sample, (ii) dissolving the pretreated sample in an acid such as nitric acid, hydrochloric acid and sulfuric acid, thereby obtaining a solution as a sample liquid, and (iii) measuring the sample liquid using a calibration curve. The calibration curve is made based on magnesium concentrations and emission intensities of three or more kinds of standard samples having known magnesium concentrations.

The above magnesium concentration corresponds to an amount of the unreacted organomagnesium compound contained in the reaction mixture. The higher the magnesium concentration is, the larger an amount of fine powders contained in the obtained solid catalyst component precursor is. Accordingly, in order to obtain the solid catalyst component precursor containing only a small amount of fine powders, the agitation is continued until the magnesium concentration decreases to 9 ppm by weight or lower, and preferably 7 ppm by weight or lower, which is a substantial ending point of the reaction.

Examples of a method for the solid-liquid separation in the step (II) are a filtration method and a decantation method. The solid-liquid separation in the step (II) is carried out preferably and effectively according to a method comprising the step of (i) stopping the agitation when the magnesium concentration decreases to 9 ppm by weight or lower, and (ii) allowing the reaction mixture to stand, thereby precipitating a solid catalyst component precursor formed.

The above step (ii) is carried out at usually −10 to 100° C., preferably 20 to 70° C., and more preferably 20 to 50° C., from an economical point of view.

The above step (ii) is not particularly limited in its time, which generally depends on a volume of a reactor or reaction mixture, and a precipitating speed of a solid catalyst component precursor. However, it is necessary to allow the reaction mixture to stand until the solid catalyst component precursor is completely precipitated. The time is usually 10 minutes to 10 days, and preferably 10 minutes to 24 hours from an economical point of view.

The solid catalyst component precursor obtained in the step (II) may be washed with a solvent to be purified. Examples of the solvent are aliphatic hydrocarbons such as pentane, hexane, heptane, octane and decane; aromatic hydrocarbons such as benzene, toluene, ethylbenzene, and xylene; alicyclic hydrocarbons such as cyclohexane and cyclopentane; and halogenated hydrocarbons such as 1,2-dichloroethane and monochlorobenzene. Among them, preferred are aliphatic hydrocarbons or aromatic hydrocarbons, more preferred are aromatic hydrocarbons, and further preferred is toluene or xylene.

Examples of the element of Group 4 of M in the above formula are titanium, zirconium and hafnium. Among them, preferred is titanium. Examples of the element of Group 13 of M therein are boron, aluminum, gallium, indium, and thallium. Among them, preferred is boron or aluminum, and more preferred is aluminum. Examples of the element of Group 14 of M therein are silicon, germanium, tin, and lead. Among them, preferred is silicon, germanium or tin, and more preferred is silicon. M is particularly preferably titanium or silicon.

Examples of $R^2$ in the above formula are linear or branched alkyl groups such as a methyl group, an ethyl group, a n-propyl group, an isopropyl group, a n-butyl group, an isobutyl group, a tert-butyl group, a n-pentyl group, an isoamyl group, a n-hexyl group, a n-heptyl group, a n-octyl group, a n-decyl group and a n-dodecyl group; cycloalkyl groups such as a cyclopentyl group and a cyclohexyl group; aryl groups such as a pheny group, a cresyl group, a xylyl group, and a naphthyl group; linear or branched alkoxy groups such as a methoxy group, an ethoxy group, a n-propoxy group, an isopropoxy group, a n-butoxy group, an isobutoxy group, a n-pentyloxy group, an isoamyloxy group, a n-hexyloxy group, a n-heptyloxy group, a n-octyloxy group, a n-decyloxy group and a n-dodecyloxy group; cycloalkoxy groups such as a cyclopentyloxy group and a cyclohexyloxy group; and aryloxy groups such as a phenoxy group, a xyloxy group, and a naphthoxy group. Among them, preferred are alkyl groups or alkoxy groups having 2 to 18 carbon atoms; or aryl groups or aryloxy groups having 6 to 18 carbon atoms.

In the above formula, m is a valence of M. When M is an element of Group 4, m is 4, when M is an element of Group 13, m is 3, and when M is an element of Group 14, m is 4.

In the above formula, b is a number satisfying $0<b\leqq m$. When M is an element of Group 4 or 14, b is a number satisfying $0<b\leqq 4$, and when M is an element of Group 13, b is a number satisfying $0<b\leqq 3$. When M is an element of Group 4 or 14, b is preferably 3 or 4, and more preferably 4. When M is an element of Group 13, b is preferably 3.

Examples of the halogenating metal compound represented by the above formula are titanium compounds disclosed in U.S. Pat. No. 6,187,883 mentioned above, and chlorinating compounds of elements of Group 13 or 14 disclosed in U.S. Pat. No. 6,903,041 mentioned above.

Halogenating titanium compounds of the halogenating metal compound represented by the above formula are preferably titanium tetrahalides such as titanium tetrachloride, titanium tetrabromide, and titanium tetraiodide, or alkoxytitanium trihalides such as methoxytitanium trichloride, ethoxytitanium trichloride, n-butoxytitanium trichloride, isobutoxytitanium trichloride, phenoxytitanium trichloride, and ethoxytitanium tribromide; more preferably titanium tetrahalides; and particularly preferably titanium tetrachloride.

The above chlorinating compounds of elements of Group 13 or 14 of the halogenating metal compound represented by the above formula are preferably ethylaluminum dichloride, ethylaluminum sesquichloride, diethylaluminum chloride, trichloaluminum, tetrachlorosilane, phenyltrichlorosilane, ethyltrichlorosilane, n-propyltrichlorosilane, or p-tolyltrichlorosilane; more preferably chlorinating compounds of elements of Group 14; and particularly preferably tetrachlorosilane or phenyltrichlorosilane.

The halogenating metal compound is used in an amount of usually 0.1 to 1,000 mmol, preferably 0.3 to 500 mmol, and particularly preferably 0.5 to 300 mmol, per one gram of the solid catalyst component precursor. The halogenating metal compound is used at one time, or in two or more batches.

Examples of the above internal electron donor are oxygen-containing electron donors such as alcohols, phenols, ketones, aldehydes, carboxylic acids, esters of organic or inorganic acids, ethers, acid amides, and acid anhydrides; and nitrogen-containing electron donors such as ammonia, amines, nitriles, and isocyanates. Among them, preferred are esters of organic acids or ethers.

Specific and preferable examples of the above esters of organic acids are ester compounds exemplified above. Among them, particularly preferred are dialkyl phthalates.

Examples of the above ethers are those disclosed in U.S. Pat. No. 6,903,041 mentioned above. Among them, preferred are dialkyl ethers, and particularly preferred is dibutyl ether or diisoamyl ether.

The internal electron donor is preferably esters of organic acids, particularly preferably dialkyl esters of aromatic dicarboxylic acids, and most preferably dialkyl phthalates.

The internal electron donor is used in an amount of usually 0.1 to 1,000 mmol, preferably 0.3 to 500 mmol, and particularly preferably 0.5 to 300 mmol, per one gram of the solid catalyst component precursor. The internal electron donor is used at one time, or in two or more batches.

Examples of the above organic acid halide optionally used are monocarboxylic acid halides and polycarboxylic acid halides. More specific examples thereof are aliphatic carboxylic acid halides, alicyclic carboxylic acid halides, and aromatic carboxylic acid halides. Further specific examples thereof are acetyl chloride, propanoyl chloride, butanoyl chloride, valeroyl chloride, acryloyl chloride, methacryloyl chloride, benzoyl chloride, toluoyl chloride, anisoyl chloride, succinoyl chloride, malonyl chloride, malenyl chloride, itaconoyl chloride, and phthaloyl chloride. Among them, preferred are aromatic carboxylic acid chlorides such as benzoyl chloride, toluoyl chloride and phthaloyl chloride, and particularly preferred is phthaloyl chloride.

The organic acid halide is used in an amount of usually 0.1 to 50 mol, further preferably 0.3 to 20 mol, and particularly preferably 0.5 to 10 mol, per one mol of titanium atoms contained in the solid catalyst component precursor. When the amount exceeds 50 mol, the obtained solid catalyst component particles may be broken.

The solid catalyst component precursor, the halogenating metal compound, the internal electron donor and the organic acid halide are not particularly limited in a method of contacting them with one another. Examples of the method are those known in the art such as a slurry method and a mechanically-crushing method (for example, ball mill crushing method). The mechanically-crushing method is carried out preferably in the presence of a dilution agent, in order to control an amount of fine powders contained in the solid catalyst component obtained, and also in order to control broadening of a particle size distribution of the solid catalyst component obtained.

Examples of the dilution agent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene. Among them, particularly preferred are aromatic hydrocarbons or halogenated hydrocarbons.

The above slurry method has a slurry concentration of usually 0.05 to 0.7 g-solid/ml-solvent, and particularly preferably 0.1 to 0.5 g-solid/ml-solvent. The above contact is carried out usually at 30 to 150° C., preferably at 45 to 135° C., and particularly preferably at 60 to 120° C. The contact time is not particularly limited, and is preferably 30 minutes to about 6 hours usually.

Examples of the organoaluminum compound used in the present invention are those disclosed in U.S. Pat. No. 6,903,041 mentioned above. Among them, preferred are trialkylaluminums, mixtures of trialkylaluminums with dialkylaluminum halides, or alkylalumoxanes; and further preferred is triethylaluminum, triisobutylaluminum, a mixture of triethylaluminum with diethylaluminum chloride, or tetraethyldialumoxane.

Examples of the external electron donor optionally used in the present invention are those disclosed in U.S. Pat. No. 6,187,883 mentioned above. Among them, preferred are oxygen-containing compounds or nitrogen-containing compounds. Examples of the oxygen-containing compounds are alkoxysilicons, ethers, esters and ketones. Among them, preferred are alkoxysilicons or ethers.

The above alkoxysilicons are preferably compounds represented by the following formula:

$$R^{26}{}_h Si(OR^{27})_{4-h}$$

wherein $R^{26}$ is a hydrocarbyl group having 1 to 20 carbon atoms, a hydrogen atom, or a hetero atom-containing group; $R^{27}$ is a hydrocarbyl group having 1 to 20 carbon atoms; h is a number satisfying $0 \leq h < 4$; and when plural $R^{26}$s or $R^{27}$s exist, they are the same as, or different from one another, respectively.

The above ethers as the external electron donor are more preferably cyclic ethers. The cyclic ethers are heterocyclic compounds having one or more ether bonds (—C—O—C—) in their rings, and are more preferably cyclic ethers having one or more diether bonds (—C—O—C—O—C—) in their rings.

The external electron donor is particularly preferably cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, 1,3-dioxolane, or 1,3-dioxane.

The solid catalyst component, the organoaluminum compound and the optionally-used external electron donor are not particularly limited in a method of contacting those components with one another, as long as a solid catalyst for olefin polymerization is formed. Their contact is carried out in the presence of a solvent, or in the absence thereof. Examples of the method of contacting those components are (i) a method comprising the steps of contacting all of those components, thereby forming a contact product (i.e., polymerization catalyst), and then supplying the contact product to a polymerization reactor, (ii) a method comprising the step of supplying those components separately to a polymerization reactor, thereby contacting those components with one another in the polymerization reactor to form a polymerization catalyst, and (iii) a method comprising the steps of contacting any two of those components with each other, thereby forming a contact product, and then supplying the contact product and the remaining one component separately to a polymerization reactor, thereby contacting them with each other in the polymerization reactor to form a polymerization catalyst.

Examples of the olefin used in the polyolefin production process of the present invention are ethylene and α-olefins having three or more carbon atoms. Examples of those α-olefins are linear mono-olefins such as propylene, 1-butene, 1-pentene, 1-hexene, 1-heptene, 1-octene and 1-decene; branched mono-olefins such as 3-methyl-1-butene, 3-methyl-1-pentene and 4-methyl-1-pentene; and cyclic mono-olefins such as vinylcyclohexane; and combinations of two or more of those olefins. Among them, preferred are homopolymers of ethylene, homopolymers of propylene, or copolymers of combinations of two or more kinds of olefins, those combinations containing ethylene or propylene as a major monomer. The above combinations of two or more kinds of olefins may contain combinations of two or more kinds of α-olefins except propylene, and may contain two or more unsaturated bond-carrying monomers such as conjugated dienes and non-conjugated dienes.

Olefin polymers produced according to the polyolefin production process of the present invention are preferably homopolymers of propylene, homopolymers of 1-butene, homopolymers of 1-pentene, homopolymers of 1-hexene, ethylene-propylene copolymers, ethylene-1-butene copolymers, ethylene-1-hexene copolymers, propylene-1-butene copolymers, propylene-1-hexene copolymers, ethylene-propylene-1-butene copolymers, ethylene-propylene-1-hexene copolymers, or block copolymers produced by multistep polymerization of those olefins.

In order to produce olefin polymers having a good powder property, the polymerization catalyst in the present invention may be produced more preferably according to the below-mentioned method than the above-mentioned method, the former method comprising the steps of:

(1) polymerizing a small amount of an olefin in the presence of the above-mentioned solid catalyst component and organoaluminum compound, thereby forming a modified solid catalyst component, whose surface is covered by the resultant olefin polymer; and (2) contacting the modified solid catalyst component with the above-mentioned organoaluminum compound and external electron donor, thereby forming a polymerization catalyst.

Regarding the above step (1):
its polymerization is referred to as "pre-polymerization" in contrast to "main polymerization" carried out in the production process of an olefin polymer of the present invention, such a pre-polymerization being disclosed in U.S. Pat. No. 6,187,883 or U.S. Pat. No. 6,903,041 mentioned above;
the used olefin is the same as, or different from olefins used in the main polymerization;
a chain-transfer agent such as hydrogen may be used to regulate a molecular weight of the resultant olefin polymer;
the above-mentioned external electron donor may be used; and
the above modified solid catalyst component is generally referred to as a "pre-polymerized solid catalyst component".

In the present invention, the term "solid catalyst component" means not only the above-mentioned unmodified solid catalyst component, but also the above-mentioned modified solid catalyst component (i.e., pre-polymerized solid catalyst component), or the combination thereof.

The above pre-polymerization is preferably a slurry polymerization in an inert hydrocarbon solvent such as propane, butane, isobutane, pentane, isopentane, hexane, heptane, octane, cyclohexane, benzene and toluene.

The organoaluminum compound in the above step (1) (i.e., pre-polymerization) is used in an amount of generally 0.5 to 700 mol, preferably 0.8 to 500 mol, and particularly preferably 1 to 200 mol, per one mol of titanium atoms contained in the solid catalyst component used in the step (1).

The olefin in the above step (1) is pre-polymerized in an amount of generally 0.01 to 1,000 g, preferably 0.05 to 500 g, and particularly preferably 0.1 to 200 g, per one gram of the solid catalyst component used in the step (1).

Slurry polymerization in the above step (1) has a slurry concentration of the solid catalyst component of preferably 1 to 500 g-solid catalyst component/liter-solvent, and particularly preferably 3 to 300 g-solid catalyst component/liter-solvent.

The above step (1) is carried out at preferably −20 to 100° C., and particularly preferably 0 to 80° C., and under a partial pressure of an olefin in a gas phase of preferably 0.01 to 2 MPa, and particularly preferably 0.1 to 1 MPa, provided that an olefin in a liquid state under a pre-polymerization temperature and a pre-polymerization pressure is not limited thereto. A pre-polymerization time is not particularly limited, and is preferably 2 minutes to 15 hours.

The solid catalyst component, organoaluminum compound and olefin in the above step (1) are supplied to a pre-polymerization reactor according to the below-exemplified method (i) or (ii):

(i) a method comprising the steps of feeding the solid catalyst component and the organoaluminum compound, and then feeding the olefin; or (ii) a method comprising the steps of feeding the solid catalyst component and the olefin, and then feeding the organoaluminum compound.

The olefin in the above step (1) is supplied to a pre-polymerization reactor according to the below-exemplified method (i) or (ii):

(i) a method of sequentially feeding the olefin to the pre-polymerization reactor, so as to keep an inner pressure of the pre-polymerization reactor at a predetermined level; or (ii) a method of feeding a predetermined total amount of the olefin at the same time to the pre-polymerization reactor.

The external electron donor in the above step (1) is optionally used in an amount of generally 0.01 to 400 mol, preferably 0.02 to 200 mol, and particularly preferably 0.03 to 100 mol, per one mol of titanium atoms containing in the solid catalyst component used in the step (1), and is optionally used in an amount of generally 0.003 to 5 mol, preferably 0.005 to 3 mol, and particularly preferably 0.01 to 2 mol, per one mol of the organoaluminum compound used in the step (1).

The external electron donor in the above step (1) is supplied to a pre-polymerization reactor according to the below-exemplified method (i) or (ii):

(i) a method of feeding independently the external electron donor to a pre-polymerization reactor; or (ii) a method of feeding a contact product of the external electron donor with the organoaluminum compound to a pre-polymerization reactor.

The organoaluminum compound in the main polymerization is used in an amount of usually 1 to 10,000 mol, and particularly preferably 5 to 6,000 mol, per one mol of titanium atoms contained in the solid catalyst component used in the main polymerization.

The external electron donor in the main polymerization is used in an amount of usually 0.1 to 2,000 mol, preferably 0.3 to 1,000 mol, and particularly preferably 0.5 to 800 mol, per one mol of titanium atoms contained in the solid catalyst component used in the main polymerization, or is used in an amount of usually 0.001 to 5 mol, preferably 0.005 to 3 mol, and particularly preferably 0.01 to 1 mol, per one mol of the organoaluminum compound used in the main polymerization.

The main polymerization is carried out (1) at usually −30 to 300° C., and preferably 20 to 180° C., (2) under a pressure, which is not particularly limited, of usually an atmospheric pressure to 10 MPa, and preferably 200 kPa to 5 MPa, from an industrial and economical point of view, (3) according to a batchwise method or a continuous method, and (4) according to (i) a slurry or solution polymerization method with inert hydrocarbon solvents such as propane, butane, isobutane, pentane, hexane, heptane and octane, (ii) a bulk polymerization method using an olefin as a solvent, which olefin is liquid at a polymerization temperature, or (iii) a gas-phase polymerization method.

In order to control a molecular weight of olefin polymers obtained in the main polymerization, there may be used a chain transfer agent such as hydrogen and alkyl zincs (for example, dimethyl zinc and diethyl zinc).

According to the present invention, there can be obtained (i) olefin polymers containing only a small amount of fine powders, (ii) a solid catalyst component precursor for olefin polymerization, (iii) an olefin polymerization solid catalyst component, and (iv) an olefin polymerization solid catalyst.

EXAMPLE

The present invention is explained in more detail with reference to the following Examples, which do not limit the present invention.

Example 1

(1) Preparation of Solid Catalyst Component Precursor for Olefin Polymerization

Step (I): A 500 ml-inner volume separable flask equipped with an agitator was purged with a nitrogen gas. There were put in the flask 188 ml of hexane (solvent), 8.9 ml (25 mmol) of tetra-n-butoxytitanium (titanium compound), and 88.2 ml (395 mmol) of tetraethoxysilane (Si—O bond-containing silicon compound). While agitating the resultant mixture, and keeping an inner temperature of the flask at 10° C., 204 ml of a di-n-butyl ether solution (concentration: 2.1 mol/liter) of n-butylmagnesium chloride (organomagnesium compound) was added dropwise to the mixture over 4 hours at a constant dropping rate. After completion of the dropwise addition, the obtained reaction mixture was adjusted to 20° C., and was continuously agitated for 24 hours. A liquid phase sampled from the reaction mixture was found to have a magnesium concentration of 7 ppm by weight. Then, the agitation was stopped, and the reaction mixture was allowed to stand for 18 hours at a room temperature (20° C.), which formed a supernatant liquid as an upper layer of the reaction mixture. The reaction mixture was found to contain no white precipitates.

Step (II): The above supernatant liquid was removed by decantation, and the obtained solid was washed with each 280 ml of toluene three times, and then was dried under reduced pressure at 40° C., thereby obtaining 62 g of a black solid catalyst component precursor. The solid catalyst component precursor was observed with a scanning electron microscope (SEM: VE-8800 manufactured by KEYENCE CORPORATION), and was found to contain no fine powders.

(2) Preparation of Solid Catalyst Component for Olefin Polymerization

There was added 160 ml of toluene to the above solid catalyst component precursor, thereby obtaining a toluene slurry of the solid catalyst component precursor. Its concentration was found to be 0.22 g-precursor/ml-solvent.

A 100 ml flask equipped with an agitator, a dropping funnel and a thermometer was purged with a nitrogen gas. The above slurry was added to the flask in such an amount that 7.00 g of the solid catalyst component precursor was added thereto. Then, 3.2 ml of toluene was added thereto to adjust the slurry concentration to 0.20 g-precursor/ml-solvent. There were added thereto 5.1 ml (31.9 mmol) of phenyltrichlorosilane (halogenating metal compound) and 5.4 ml (74 mmol) of di(2-ethylhexeyl)phthalate (internal electron donor), and the resultant mixture was agitated at 105° C. for 2 hours. The mixture was solid-liquid separated, and the obtained solid was washed at 100° C. with each 35 ml of toluene three times, thereby obtaining a washed solid. The washed solid was combined with 10 ml of toluene, and 3.5 ml (32 mmol) of titanium tetrachloride (halogenating metal compound) was added thereto, and the resultant mixture was agitated at 105° C. for 2 hours. The mixture was solid-liquid separated. The obtained solid was washed at 100° C. with each 35 ml of toluene six times, and was further washed at a room temperature with each 35 ml of hexane two times. The washed solid was dried under reduced pressure, thereby obtaining 7.31 g of a solid catalyst component having an excellent particle property.

The solid catalyst component was found to contain 0.77% by weight of titanium atoms, 27% by weight of di(2-ethylhexeyl)phthalate, and was found to have a median particle diameter of 35.1 μm, the total of the solid catalyst component being 100% by weight. The solid catalyst component was observed with a SEM, and was found to contain no fine powders.

Results are shown in Table 1.

The above magnesium concentration (7 ppm by weight) was measured according to a high-frequency inductively coupled plasma emission spectrometry (ICP emission spectrometry), comprising the steps of:

(i) sampling 1 ml of a liquid phase from a reaction mixture;

(ii) adding 6 ml of ethanol thereto, thereby obtaining a diluted liquid;

(iii) weighing out a part of the diluted liquid with a platinum plate;

(iv) adding several milliliters of concentrated sulfuric acid thereto;

(v) heating it with a heater, thereby obtaining a carbonized material;

(vi) heating the carbonized material in an electric furnace, thereby obtaining an ash material;

(vii) adding several milliliters of concentrated sulfuric acid thereto;

(viii) evaporating it to dryness, thereby obtaining a solid;

(ix) adding several milliliters of concentrated hydrochloric acid and pure water to the solid, and heating the resultant mixture, thereby obtain a solution;

(x) adding water to the solution, thereby obtaining a sample solution for measurement;

(xi) measuring an ICP atom excitation spectrum (ICP-AES) with VISTA-PRO manufactured by Varian, Inc.; and (xii) calculating a magnesium concentration using a separately-prepared calibration curve.

The above median particle diameter of the solid catalyst component was measured using SALD-2100 manufacture by Shimadzu Corporation.

The above amount of titanium atoms (0.77% by weight) contained in the solid catalyst component was measured according to a method comprising the steps of:

(i) decomposing about 20 mg of the solid catalyst component with about 30 ml of 2 normal (2N) dilute sulfuric acid;

(ii) adding 3 ml (excess amount) of hydrogen peroxide water having a concentration of 3% by weight thereto, thereby preparing a liquid sample;

(iii) measuring a characteristic absorption of the liquid sample at 410 nm with a double-beam spectrophotometer, U-2001, manufactured by Hitachi, Ltd.; and (iv) obtaining an amount of titanium atoms using a separately-prepared calibration curve.

The above amount of di(2-ethylhexeyl)phthalate (27% by weight) contained in the solid catalyst component was measured according to a method comprising the steps of:

(i) dissolving about 30 mg of the solid catalyst component in a mixed solvent consisting of N,N-dimethylacetamide (75 ml) and hexane (25 ml), thereby preparing a solution; and (ii) measuring an amount of di(2-ethylhexeyl)phthalate contained in the solution according to a gas chromatography internal standard method.

Example 2

(1) Preparation of Solid Catalyst Component Precursor for Olefin Polymerization

Step (I): The step (I) of Example 1 was repeated except that the continuous agitation time of 24 hours after completion of the dropwise addition was changed to 20 hours. A liquid phase sampled from the reaction mixture was found to have a magnesium concentration of 7 ppm by weight. Then, the agitation was stopped, and the reaction mixture was allowed to stand for 18 hours at a room temperature (20° C.), which formed a supernatant liquid as an upper layer of the reaction mixture. The reaction mixture was found to contain no white precipitates.

Step (II): The step (II) of Example 1 was repeated, and the obtained solid catalyst component precursor was found to contain no fine powders (SEM observation).

Results are shown in Table 1.

Comparative Examples 1 to 4

(1) Preparation of Solid Catalyst Component Precursor for Olefin Polymerization

Step (I): The step (I) of Example 1 was repeated except that the continuous agitation time of 24 hours after completion of the dropwise addition was changed to 12 hours, 6 hours, 3 hours and 1 hour, respectively. A liquid phase sampled from the reaction mixture was found to have a magnesium concentration of 13 ppm by weight, 20 ppm by weight, 300 ppm by weight and 700 ppm by weight, respectively. The reaction mixture was found to contain a small amount of white precipitates in Comparative Examples 1 and 2, and was found to contain a large amount of white precipitates in Comparative Examples 3 and 4.

Step (II): The step (II) of Example 1 was repeated, respectively. The obtained solid catalyst component precursor was found to contain a small amount of fine powders in Comparative Examples 1 and 2, and was found to contain a large amount of fine powders (SEM observation) in Comparative Examples 3 and 4.

Results are shown in Table 1.

Comparative Example 5

(1) Preparation of Solid Catalyst Component Precursor for Olefin Polymerization

Step (I): The step (I) of Example 1 was repeated except that the continuous agitation after completion of the dropwise addition was not carried out. A liquid phase sampled from the reaction mixture was found to have a magnesium concentration of 2,200 ppm by weight. The reaction mixture was allowed to stand for 18 hours at a room temperature (20° C.), which formed a supernatant liquid as an upper layer of the reaction mixture. The reaction mixture was found to contain an extremely large amount of white precipitates.

Step (II): The step (II) of Example 1 was repeated, thereby obtaining 62 g of a solid catalyst component precursor. The obtained solid catalyst component precursor was found to contain an extremely large amount of fine powders (SEM observation).

(2) Preparation of Solid Catalyst Component for Olefin Polymerization

Section (2) of Example 1 was repeated except that the solid catalyst component precursor was changed to that obtained in above Section (1) of Comparative Example 5, thereby obtaining 7.30 g of a solid catalyst component.

The solid catalyst component was found to contain 0.64% by weight of titanium atoms, 27% by weight of di(2-ethylhexeyl)phthalate, and was found to have a median particle diameter of 36.4 μm, the total of the solid catalyst component being 100% by weight. The solid catalyst component was observed with a SEM, and was found to contain an extremely large amount of fine powders.

Results are shown in Table 1.

Example 3

(1) Preparation of Solid Catalyst Component Precursor for Olefin Polymerization

Step (I): The step (I) of Example 1 was repeated except that (i) the continuous agitation temperature of 20° C. after completion of the dropwise addition was changed to 35° C., and (ii) the agitation time of 24 hours thereafter was changed to 4 hours. A liquid phase sampled from the reaction mixture was found to have a magnesium concentration of 7 ppm by weight. Then, the agitation was stopped pepped, and the reaction mixture was allowed to stand for 18 hours at a room temperature (20° C.), which formed a supernatant liquid as an upper layer of the reaction mixture. The reaction mixture was found to contain no white precipitates.

Step (II): The step (II) of Example 1 was repeated, and the obtained solid catalyst component precursor was found to contain no fine powders (SEM observation).

Results are shown in Table 1.

Example 4

(1) Preparation of Solid Catalyst Component Precursor for Olefin Polymerization Step (I): The step (I) of Example 1 was repeated except that (i) the continuous agitation temperature of 20° C. after completion of the dropwise addition was changed to 40° C., and (ii) the agitation time of 24 hours thereafter was changed to 4 hours. A liquid phase sampled from the reaction mixture was found to have a magnesium concentration of 7 ppm by weight. Then, the agitation was stopped, and the reaction mixture was allowed to stand for 18 hours at a room temperature (20° C.), which formed a supernatant liquid as an upper layer of the reaction mixture. The reaction mixture was found to contain no white precipitates.

Step (II): The step (II) of Example 1 was repeated, and the obtained solid catalyst component precursor was found to contain no fine powders (SEM observation).

(2) Preparation of Solid Catalyst Component for Olefin Polymerization

Section (2) of Example 1 was repeated except that the solid catalyst component precursor was changed to that obtained in above Section (1) of Example 4, thereby obtaining 7.69 g of a solid catalyst component excellent in its particle property. The solid catalyst component was observed with a SEM, and was found to contain no fine powders.

(3) Olefin Polymerization

A 3 liter-inner volume autoclave equipped with an agitator was dried sufficiently, and was made vacuum. There were put therein 0.087 MPa of hydrogen, 640 g of butane and 110 g of 1-butene, and the autoclave was heated up to 70° C. Ethylene was added thereto till its partial pressure reached 0.6 MPa. There were pressed into the autoclave 14.2 mg of the solid catalyst component obtained in above Section (2) and 5.7 mmol of triethylaluminum (organoaluminum compound) with argon gas, thereby initiating a polymerization reaction. While feeding ethylene continuously into the autoclave, and keeping its total pressure constant, the polymerization reaction was carried out at 70° C. for 3 hours. After completion of the polymerization reaction, the unreacted monomers were purged, thereby obtaining 88.0 g of an ethylene-1-butene copolymer excellent in its powder property. A yield of the copolymer per one g of the solid catalyst component was 6,200 g-copolymer/g-solid catalyst component (polymerization activity). The copolymer had a short-chain branch number (SCB) of 12.8; 2.9% by weight of soluble parts in xylene (CXS); a bulk density of 0.352 g/cm$^3$; a melt flow rate (MFR) of 0.48; a melt flow rate ratio (MFRR) of 24.8; an intrinsic viscosity ([η]) of 2.0 dl/g; and 0.9% by weight of powders having a particle diameter of 177 μm or less, the total weight of the copolymer being 100% by weight.

Results are shown in Table 1.

The above SCB, which means the number of methyl groups per 1,000 carbon atoms, was obtained from characteristic absorptions of ethylene units and α-olefin units (1-butene units) assigned in an infrared absorption spectrum measured with an infrared spectrophotometer, FT/IR-470 PLUS, manufactured by Japan Spectroscopic Co., Ltd., using a calibration curve.

The above CXS, which means an amount of parts soluble in xylene at 20° C., was measured according to a method comprising the steps of:

(i) adding 1 g of the copolymer to 200 ml of boiling xylene, thereby obtaining a solution of the copolymer in xylene;
(ii) cooling the solution slowly down to 50° C.;
(iii) further cooling the solution down to 20° C. by dipping it in an iced water bath under agitation;
(iv) keeping the solution at 20° C. for 3 hours, thereby precipitating the copolymer;
(v) filtering off the precipitated copolymer, thereby obtaining a filtrate;
(vi) distilling xylene contained in the filtrate away to dryness, thereby obtaining soluble parts;
(vii) weighing the soluble parts; and
(viii) calculating CXS based thereon.

The above bulk density was measure according to JIS K6721 (1966), "JIS" being Japanese Industrial Standards.

The above MFR means a flow rate of the copolymer in a molten state, and was measured at 190° C. under a load according to ASTM D1238, and the above MFRR means a ratio of an MFR measured under a load of 21.60 kg to an MFR measured under a load of 2.16 kg. In general, the wider a molecular weight distribution of a polymer is, the larger its MFRR is.

The above [η] was measured at 135° C., using tetrahydronaphthalene as a solvent.

The above amount of powders having a particle diameter of 177 μm or less was measured by using a sieve.

Comparative Example 6

(1) Preparation of Solid Catalyst Component Precursor for Olefin Polymerization Step (I): The step (I) of Example 1 was repeated except that (i) the continuous agitation temperature of 20° C. after completion of the dropwise addition was changed to 40° C., and (ii) the agitation time of 24 hours thereafter was changed to 2 hours. A liquid phase sampled from the reaction mixture was found to have a magnesium concentration of 10 ppm by weight. Then, the agitation was stopped, and the reaction mixture was allowed to stand for 18 hours at a room temperature (20° C.), which formed a supernatant liquid as an upper layer of the reaction mixture. The reaction mixture was found to contain a small amount of white precipitates.

Step (II): The step (II) of Example 1 was repeated, and the obtained solid catalyst component precursor was found to contain a small amount of fine powders (SEM observation).

(2) Preparation of Solid Catalyst Component for Olefin Polymerization

Section (2) of Example 1 was repeated except that the solid catalyst component precursor was changed to that obtained in above Section (1) of Comparative Example 6, thereby obtaining 7.33 g of a solid catalyst component. The solid catalyst component was observed with a SEM, and was found to contain a small amount of fine powders.

(3) Olefin Polymerization

Section (3) of Example 4 was repeated except that the solid catalyst component was changed to 12.1 mg of the solid catalyst component obtained in above Section (2), thereby obtaining 77.0 g of an ethylene-1-butene copolymer. A yield of the copolymer per one g of the solid catalyst component was 6,400 g-copolymer/g-solid catalyst component (polymerization activity). The copolymer had a short-chain branch number (SCB) of 12.1; 2.4% by weight of soluble parts in xylene (CXS); a bulk density of 0.360 g/cm³; a melt flow rate (MFR) of 0.42; a melt flow rate ratio (MFRR) of 25.0; an intrinsic viscosity ([η]) of 2.0 dl/g; and 1.7% by weight of powders having a particle diameter of 177 μm or less, the total weight of the copolymer being 100% by weight.

Results are shown in Table 1.

TABLE 1

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Agitation conditions: | | | | | | | | | | |
| Temperature (° C.) | 20 | 20 | 35 | 40 | 20 | 20 | 20 | 20 | 20 | 40 |
| Time (hr) | 24 | 20 | 4 | 4 | 12 | 6 | 3 | 1 | 0 | 2 |
| Magnesium concentration (ppm) | 7 | 7 | 7 | 7 | 13 | 20 | 300 | 700 | 2,200 | 10 |
| Amount of white precipitates in Step (I) | 0 | 0 | 0 | 0 | small amount | small amount | large amount | large amount | extremely large amount | small amount |
| Amount of fine powders in Step (II) | 0 | 0 | 0 | 0 | small amount | small amount | large amount | large amount | extremely large amount | small amount |
| Catalyst component: | | | | | | | | | | |
| Amount of fine powder ≦20 μm (%) | 0 | — | — | 0 | — | — | — | — | extremely large amount | small amount |
| Polyolefin: | | | | | | | | | | |
| Amount of powder ≦177 μm (%) | — | — | — | 0.9 | — | — | — | — | — | 1.7 |

Example 5

(1) Preparation of Solid Catalyst Component for Olefin Polymerization

There was added 160 ml of toluene to the solid catalyst component precursor obtained in Section (1) of Example 4, thereby obtaining a toluene slurry of the solid catalyst component precursor. Its concentration was found to be 0.22 g-precursor/ml-solvent.

A 100 ml flask equipped with an agitator, a dropping funnel and a thermometer was purged with a nitrogen gas. The above slurry was added to the flask in such an amount that 8.00 g of the solid catalyst component precursor was added thereto. Then, 3.6 ml of toluene was added thereto to adjust the slurry concentration to 0.20 g-precursor/ml-solvent. The flask inner temperature was adjusted to 95°, and 5.4 ml (20 mmol) of diisobutyl phthalate was added thereto, and the resultant mixture was agitated for 30 minutes. The mixture was solid-liquid separated, and the obtained solid was washed at 90° C. with each 32 ml of toluene two times, thereby obtaining a washed solid. The washed solid was combined with 10 ml of toluene, and a mixed liquid of 0.72 ml (7.0 mmol) of dibutyl ether, 0.40 ml (1.5 mmol) of diisobutyl phthalate and 12.8 ml (117 mmol) of titanium tetrachloride was added thereto, and the resultant mixture was agitated at 105° C. for 3 hours. The obtained mixture was solid-liquid separated. The separated solid was washed at 100° C. with each 32 ml of toluene two times. The washed solid was combined with 14 ml of toluene, and a mixed liquid of 0.72 ml (7.0 mmol) of dibutyl ether and 6.4 ml (58 mmol) of titanium tetrachloride was added thereto, and the resultant mixture was agitated at 105° C. for 3 hours. The obtained mixture was solid-liquid separated. The separated solid was washed at 100° C. with each 32 ml of toluene three times, and was further washed at a room temperature with each 35 ml of hexane three times. The washed solid was dried under reduced pressure, thereby obtaining 6.89 g of a solid catalyst component having an excellent particle property.

The solid catalyst component was found to contain 2.15% by weight of titanium atoms, 2.0% by weight of diethyl phthalate, 4.9% by weight of ethylisobutyl phthalate, 6.2% y weight of diisobutyl phthalate, and was found to have a median particle diameter of 28 μm. The solid catalyst component was observed with a SEM, and was found to contain no fine powders.

(2) Olefin Polymerization

A 3 liter-inner volume autoclave equipped with an agitator was dried sufficiently, and was made vacuum. There were put therein 0.033 MPa of hydrogen, and then 2.63 mmol of triethylaluminum (organoaluminum compound), 0.26 mmol of cyclohexylethyldimethoxysilane (external electron donor), and 9.21 mg of the solid catalyst component prepared in Section (2) of Example 5 were added thereto. Then, 780 g of propylene was added to the autoclave, and the autoclave was heated up to 80° C., thereby polymerizing propylene at 80° C. for 1 hour. After completion of the polymerization reaction, the unreacted monomer was purged, thereby obtaining 266 g of a propylene polymer excellent in its powder property. A yield of the polymer per one g of the solid catalyst component was 28,800 g-polymer/g-solid catalyst component (polymerization activity). The polymer had 0.96% by weight of soluble parts in xylene (CXS); a bulk density of 0.465 g/cm³; an intrinsic viscosity ([η]) of 2.0 dl/g; and 0.6% by weight of powders having a particle diameter of 177 μm or less, the total weight of the copolymer being 100% by weight.

Comparative Example 7

(1) Preparation of Solid Catalyst Component for Olefin Polymerization

There was added 160 ml of toluene to the solid catalyst component precursor obtained in Section (1) of Comparative Example 5, thereby obtaining a toluene slurry having a concentration of 0.22 g-precursor/ml-solvent.

A 100 ml flask equipped with an agitator, a dropping funnel and a thermometer was purged with a nitrogen gas. The above slurry was added to the flask in such an amount that 8.00 g of the solid catalyst component precursor was added thereto. Then, 3.6 ml of toluene was added thereto to adjust the slurry concentration to 0.20 g-precursor/ml-solvent. The flask inner temperature was adjusted to 95°, and 5.4 ml (20 mmol) of diisobutyl phthalate was added thereto, and the resultant mixture was agitated for 30 minutes. The mixture was solid-liquid separated, and the obtained solid was washed at 90° C. with each 32 ml of toluene two times, thereby obtaining a washed solid. The washed solid was combined with 10 ml of toluene, and a mixed liquid of 0.72 ml (7.0 mmol) of dibutyl ether, 0.40 ml (1.5 mmol) of diisobutyl phthalate and 12.8 ml (117 mmol) of titanium tetrachloride was added thereto, and the resultant mixture was agitated at 105° C. for 3 hours. The obtained mixture was solid-liquid separated. The separated solid was washed at 100° C. with each 32 ml of toluene two times. The washed solid was combined with 14 ml of toluene, and a mixed liquid of 0.72 ml (7.0 mmol) of dibutyl ether and 6.4 ml (58 mmol) of titanium tetrachloride was added thereto, and the resultant mixture was agitated at 105° C. for 3 hours. The obtained mixture was solid-liquid separated. The separated solid was washed at 100° C. with each 32 ml of toluene three times, and was further washed at a room temperature with each 35 ml of hexane three times. The washed solid was dried under reduced pressure, thereby obtaining 6.26 g of a solid catalyst component having an excellent particle property.

The solid catalyst component was found to contain 1.99% by weight of titanium atoms, 2.0% by weight of diethyl phthalate, 5.1% by weight of ethylisobutyl phthalate, 6.9% y weight of diisobutyl phthalate, and was found to have a median particle diameter of 29 μm. The solid catalyst component was observed with a SEM, and was found to contain a large amount of fine powders.

(2) Olefin Polymerization

Section (3) of Example 5 was repeated except that the solid catalyst component was changed to 6.76 mg of the solid catalyst component prepared in Section (1) of Comparative Example 7, thereby obtaining 266 g of a propylene polymer. A yield of the polymer per one g of the solid catalyst component was 35,200 g-polymer/g-solid catalyst component (polymerization activity). The polymer had 0.82% by weight of soluble parts in xylene (CXS); a bulk density of 0.460 g/cm$^3$; an intrinsic viscosity ([η]) of 1.9 dl/g; and 2.2% by weight of powders having a particle diameter of 177 μm or less, the total weight of the copolymer being 100% by weight.

The invention claimed is:

1. A process for producing a solid catalyst component precursor for olefin polymerization, comprising the steps of:

(I) adding an organomagnesium compound to a solution containing a solvent, a Si—O bond-containing silicon compound, and a titanium compound represented by the following formula, under an agitation, and continuing the agitation until a magnesium concentration in a liquid phase of a reaction mixture decreases to 9 ppm by weight or lower; and (II) solid-liquid separating the reaction mixture;

$$Ti(OR^1)_a X^1_{4-a}$$

wherein $R^1$ is a hydrocarbyl group having 1 to 20 carbon atoms; $X^1$ is a halogen atom; and a is a number satisfying $1 < a \leq 4$.

2. The process for producing a solid catalyst component precursor for olefin polymerization according to claim 1, wherein the continuing agitation is carried out until a magnesium concentration in a liquid phase of a reaction mixture decreases to 7 ppm by weight or lower.

3. The process for producing a solid catalyst component precursor for olefin polymerization according to claim 1, wherein the continuing agitation is carried out for 15 to 200 hours at 10° C. to lower than 30° C.

4. The process for producing a solid catalyst component precursor for olefin polymerization according to claim 1, wherein the continuing agitation is carried out for 3 to 200 hours at 30 to 70° C.

5. A process for producing an olefin polymerization solid catalyst component, comprising the step of contacting a solid catalyst component precursor for olefin polymerization produced according to the production process of claim 1 with a halogenating metal compound represented by the following formula, an internal electron donor, and an optional organic acid halide:

$$M(R^2)_b X^2_{m-b}$$

wherein M is an element of Group 4, 13 or 14; $R^2$ is an alkyl group having 1 to 20 carbon atoms, an aryl group, an alkoxy group, or an aryloxy group; $X^2$ is a halogen atom; m is an atomic valence of M; and b is a number satisfying $0 < b \leq m$.

6. A process for producing an olefin polymerization solid catalyst, comprising the step of contacting an olefin polymerization solid catalyst component produced according to the production process of claim 5 with an organoaluminum compound, and an optional external electron donor.

7. A process for producing an olefin polymer, comprising the step of polymerizing an olefin in the presence of an olefin polymerization solid catalyst produced according to the production process of claim 6.

* * * * *